(12) United States Patent
Chiang

(10) Patent No.: US 8,033,198 B2
(45) Date of Patent: Oct. 11, 2011

(54) SHIFT CONTROL DEVICE FOR BICYCLE

(75) Inventor: Douglas Chiang, Wufong Township, Taichung County (TW)

(73) Assignee: Tien Hsin Industries Co., Ltd., Taichung County (TW)

( * ) Notice: Subject to any disclaimer, the term of this patent is extended or adjusted under 35 U.S.C. 154(b) by 186 days.

(21) Appl. No.: 12/469,746

(22) Filed: May 21, 2009

(65) Prior Publication Data

US 2010/0011902 A1  Jan. 21, 2010

(30) Foreign Application Priority Data

Jul. 16, 2008 (TW) ............................... 97126986 A

(51) Int. Cl.
*F16C 1/10* (2006.01)
(52) U.S. Cl. ..................................... 74/502.2
(58) Field of Classification Search ............ 74/488, 74/489, 500.5, 501.6, 502.2
See application file for complete search history.

(56) References Cited

U.S. PATENT DOCUMENTS

| | | | | |
|---|---|---|---|---|
| 5,203,213 A | * | 4/1993 | Nagano | 74/473.14 |
| 5,307,706 A | * | 5/1994 | Nagano | 74/502.2 |
| 2002/0144566 A1 | * | 10/2002 | Liu et al. | 74/502.2 |

* cited by examiner

*Primary Examiner* — Vicky Johnson
(74) *Attorney, Agent, or Firm* — Alan Kamrath; Kamrath & Associates PA

(57) ABSTRACT

A shift control device includes a shift-up control apparatus, a shift-down control apparatus and a transmission control assembly. The shift-up control apparatus includes an operable shift-up controller, a first link member connected with the shift-up controller and a first pawl pivotally mounted on the first link member. The shift-down control apparatus includes an operable shift-down controller and a second link member connected with the shift-down controller. The second link member includes first and second actuating members. The transmission control assembly includes a locking member, a housing assembly and first and second pawls. The locking member is moveable in the housing at various positions for various bicycle speed transmissions and includes first and second engaging sections. The first engaging section is selectively engaged by the first pawl of the shift-up control apparatus and the second engaging section is selectively engaged by the first and second pawls of the transmission control assembly.

17 Claims, 19 Drawing Sheets

SHIFT CONTROL DEVICE FOR BICYCLE

BACKGROUND OF THE INVENTION

1. Field of the Invention

The present invention relates to a shift control device for changing speed transmission for a bicycle and, in particular, to an easily operable shift control device.

2. Description of the Related Art

It is common that bicycle shift control devices are installed on handlebars of bicycles. The shift control device has a lever for a user to change speed transmission of the bicycle, and the user generally uses his/her thumb to operate the lever. However, the control device is not an ergonomic design, because the user has to apply a relatively substantial force to execute the speed transmission. Furthermore, if the shift control device is not operated with sufficient force, it often happens that the change in speed transmission is not successful.

The present invention is, therefore, intended to obviate or at least alleviate the problems encountered in the prior art.

SUMMARY OF THE INVENTION

According to the present invention, a shift control device includes a shift-up control apparatus, a shift-down control apparatus and a transmission control assembly.

The shift-up control apparatus includes an operable shift-up controller, a first link member connected with the shift-up controller and a first pawl pivotally mounted on the first link member.

The shift-down control apparatus includes an operable shift-down controller and a second link member connected with the shift-down controller. The second link member includes first and second actuating members.

The transmission control assembly includes a locking member, a housing assembly and first and second pawls. The locking member is moveable in the housing at various positions for various bicycle speed transmissions and includes first and second engaging sections. The first engaging section is selectively engaged by the first pawl of the shift-up control apparatus, and the second engaging section is selectively engaged by the first and second pawls of the transmission control assembly.

The operation of the shift-up controller enables movement of the first link member and the first pawl of the shift-up control apparatus to engage with the first engaging section, and in addition, further movement of the first link member causes travel of the locking member in a first direction and movement of the locking member causes the second pawl of the transmission control assembly to disengage from the second engaging section and engage with the second engaging section reciprocally.

The operation of the shift-down controller enables the first actuating member to cause the first pawl of the transmission control assembly to engage with the second engaging section and the second actuating member to cause the second pawl of the transmission control assembly to disengage from the second engaging section, and enables further movement of the shift-down controller to cause travel of the locking member in a second direction reverse to the first direction.

It is therefore an object of the present invention to provide a bicycle shift device that is easily operable.

It is a further object of the present invention to provide a bicycle device that shifts up/shifts down bicycle speed transmission precisely.

DETAILED DESCRIPTION OF THE PREFERRED EMBODIMENT

Figure 1:
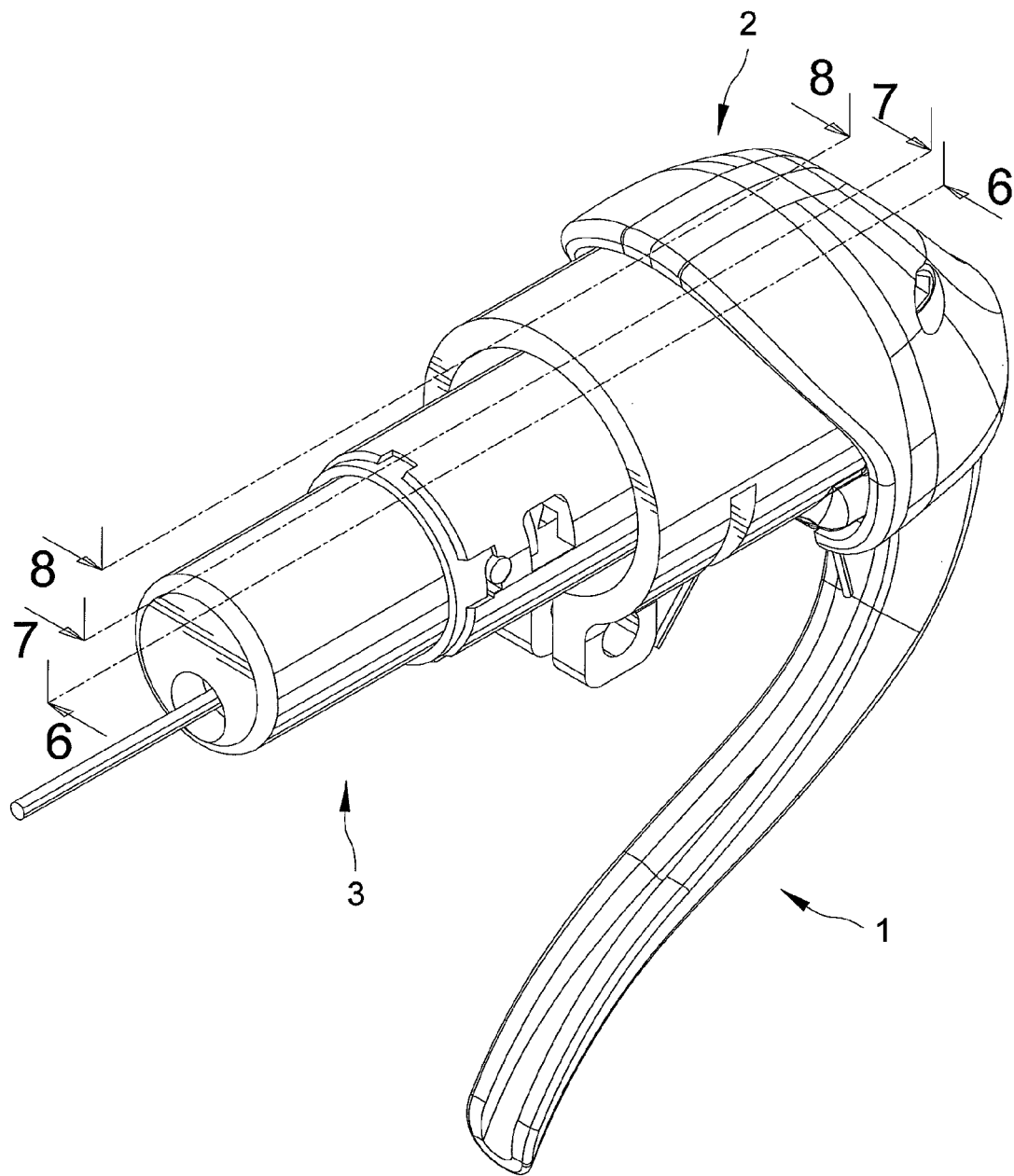
FIG. 1 is a perspective view of a shift control device in accordance with the present invention.
Figure 2:
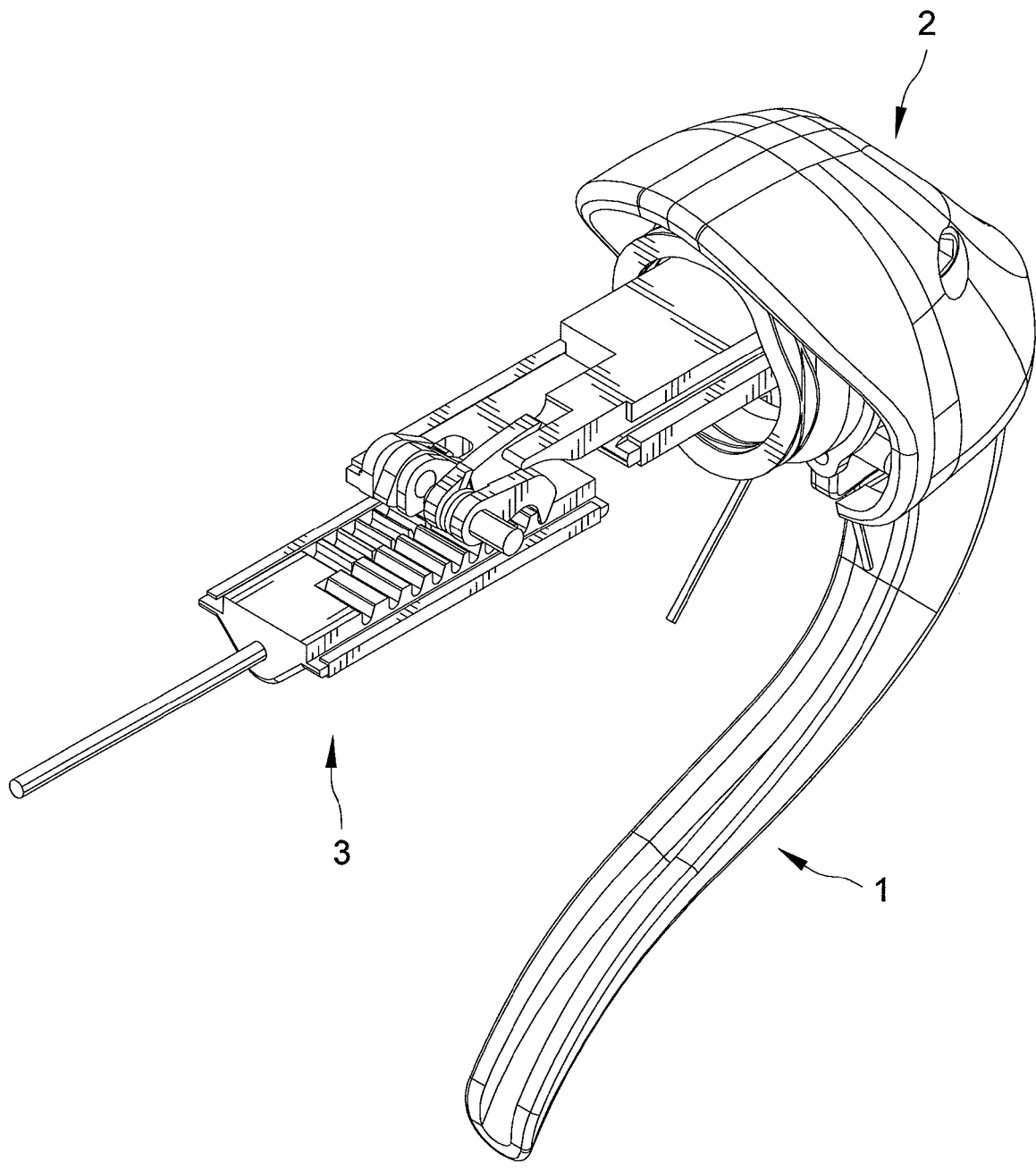
FIG. 2 is another perspective view of the shift control device, with an outer case removed in order to show components inside the shell.
Figure 3:
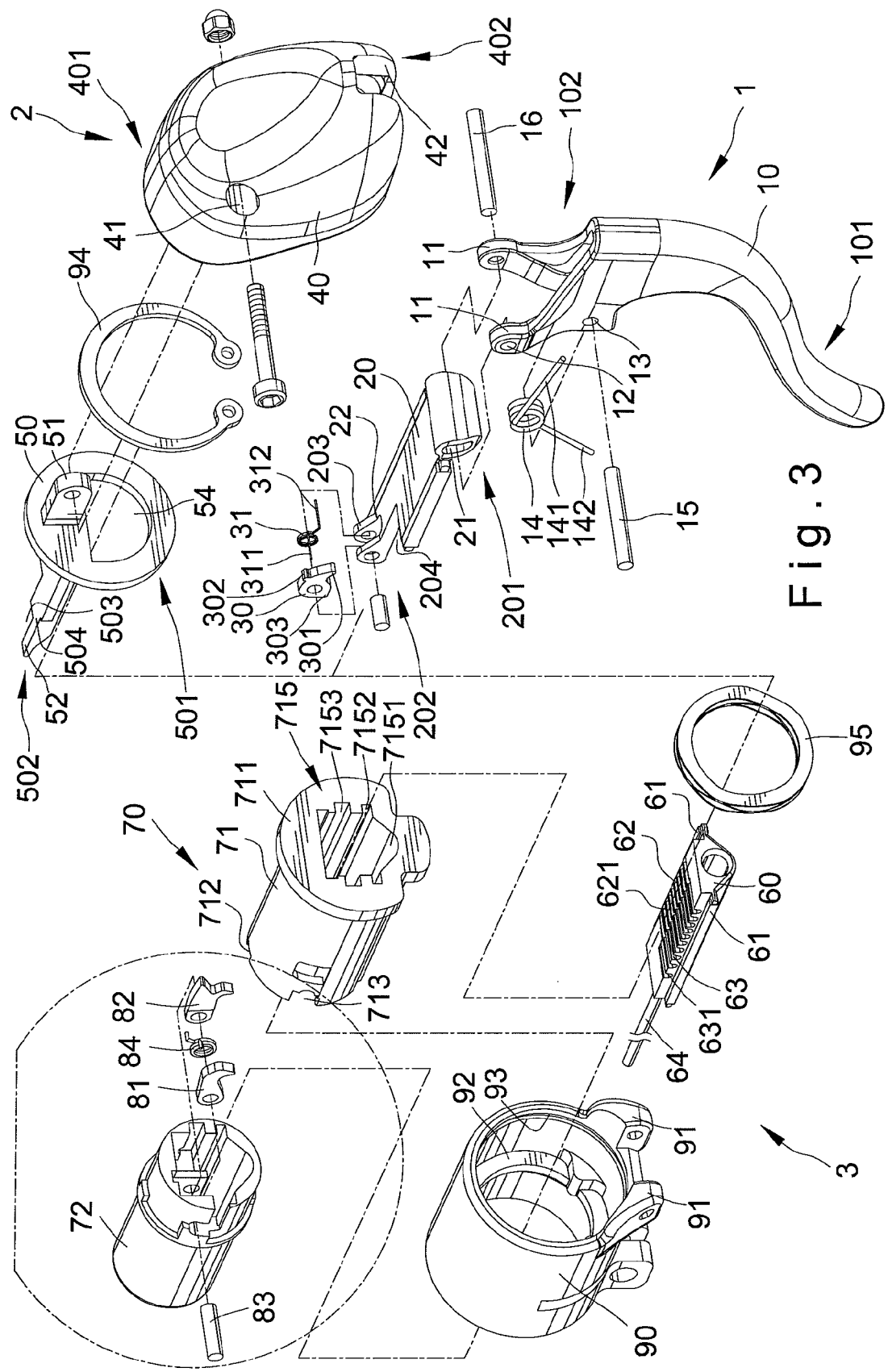
FIG. 3 is an exploded, perspective view of the shift control device shown in FIG. 1.
Figure 4:
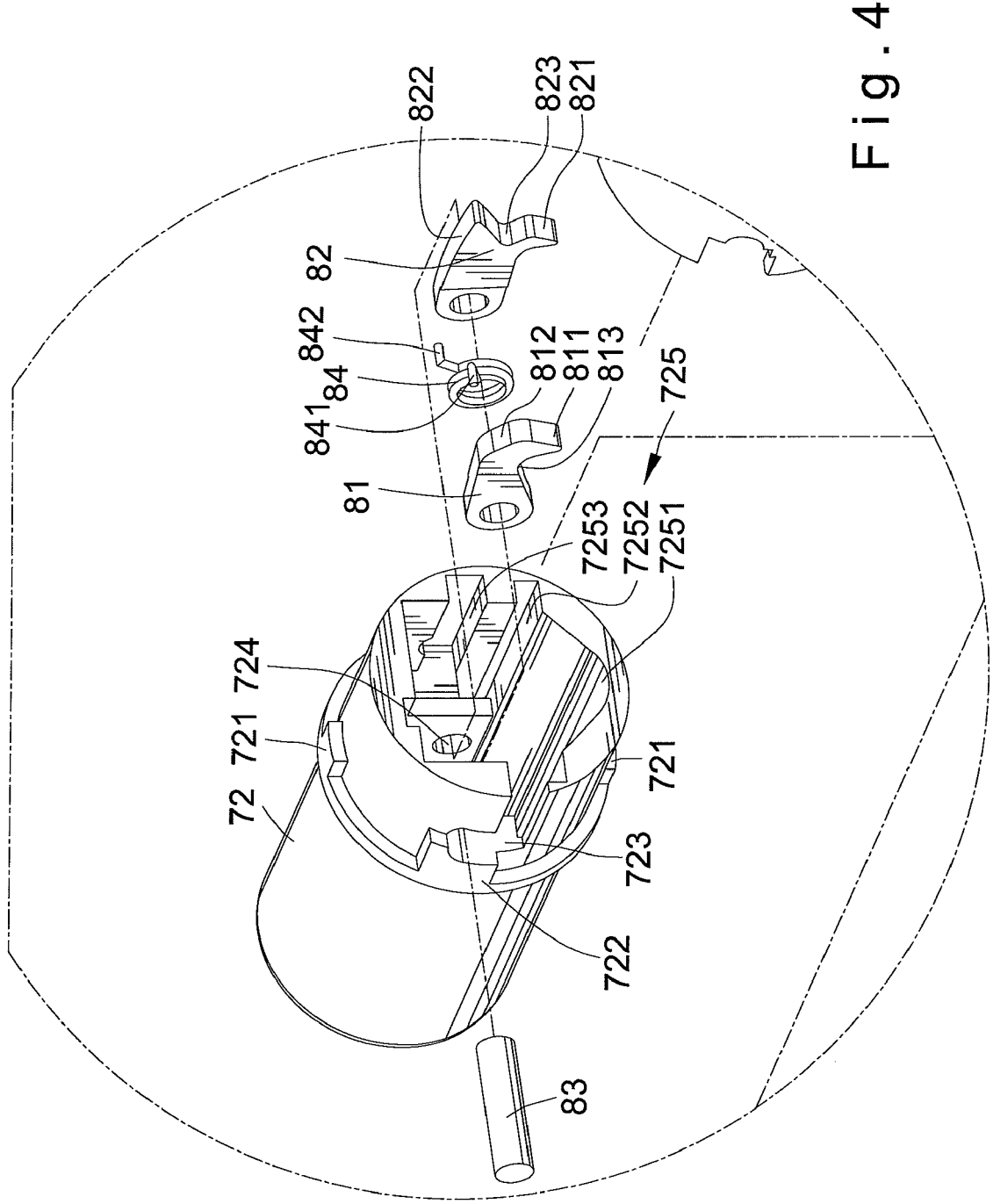
FIG. 4 is a partial, enlarged view of the shift control device shown in FIG. 3.
Figure 5:
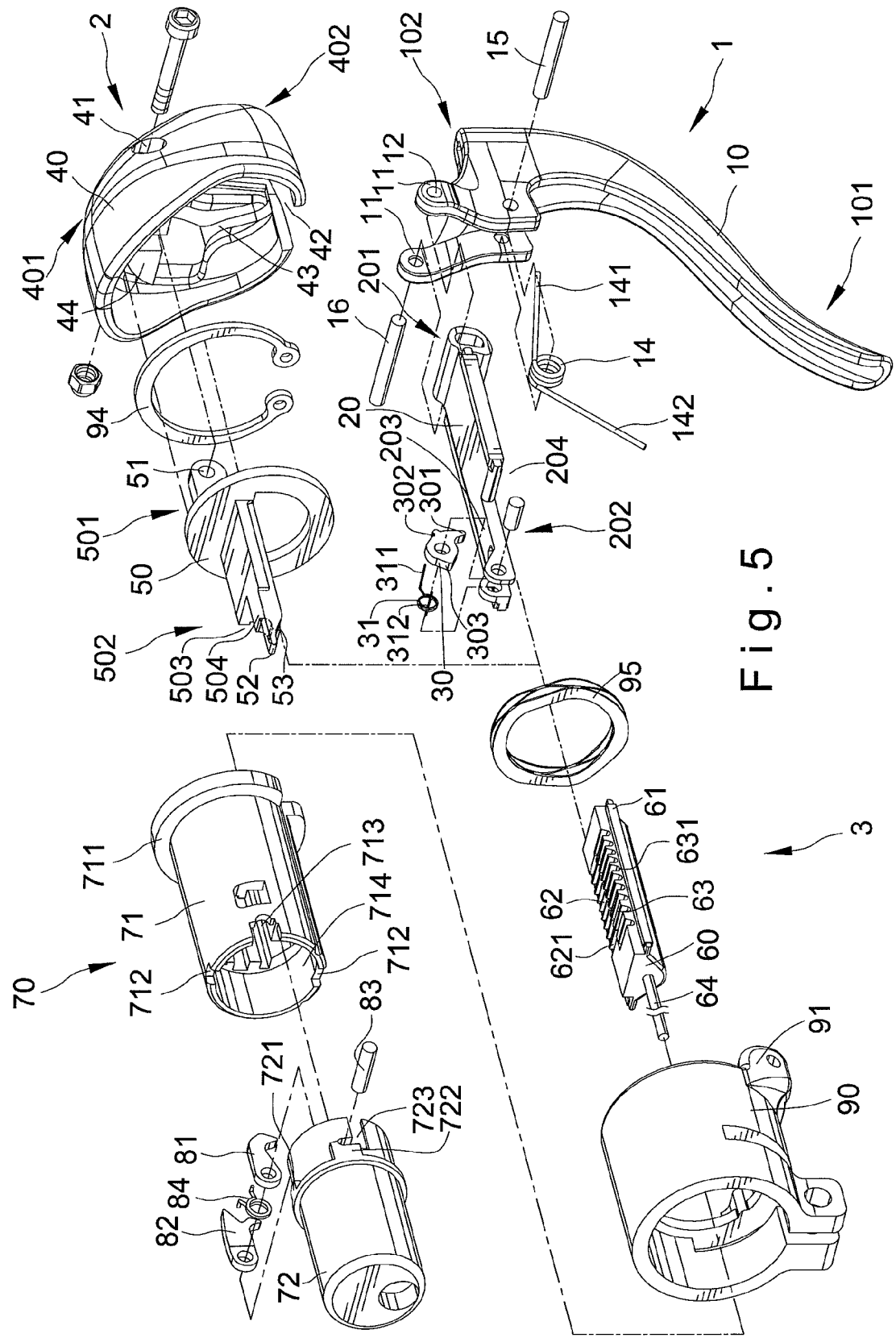
FIG. 5 is an exploded, perspective view of the shift control device of FIG. 1 from a different angle.

FIGS. 1 and 2 show a perspective view of a shift control device in accordance with the present invention. The shift control device can change bicycle speed transmission and includes a shift-up control apparatus 1, a shift-down control apparatus 2 and a transmission control assembly 3.

Referring to FIGS. 3 through 6, the shift-up control apparatus 1 includes a shift-up controller 10, a first link member 20 and a first pawl 30. The shift-up controller 10 includes a first end 101 and a second end 102. A user puts his/her hand on the first end 101 to control the shift-up controller 10. The second end 102 includes two connecting lobes 11 each has a first hole 12 and a second hole 13. Additionally, the two connecting lobes 11 receive the first link member 20 and an elastic member 14 therebetween.

An axle 15 is inserted through the elastic member 14 to connect with the shift-up controller 10, and the axle 15 has two ends received by the two second holes 13, respectively. In the preferred embodiment, the elastic element 14 includes at least one loop and defines two terminating ends, a first leg 141 extending from one terminating end and a second leg 142 extending from the other terminating end. The first and second legs 141 and 142 extend in different directions. Additionally, the first leg 141 abuts against a periphery of the shift-up controller 10 that joins the two connecting lobes 11.

The first link member 20 includes a first joining end 201 and a second joining end 202. The first joining end 201 includes an aperture 21 positioned corresponding to the position of the two first holes 12. The first joining end 201 of the first link member 20 is securely connected with the shift-up controller 10 by inserting an axle 16 through the first holes 12 and the apertures 21.

The second joining end 202 includes a first section 203 and a second section 204. The first section 203 includes an extension. In the preferred embodiment, the number of extensions is two. The second section 204 is a space recessed in the first link member 20.

Figure 10:
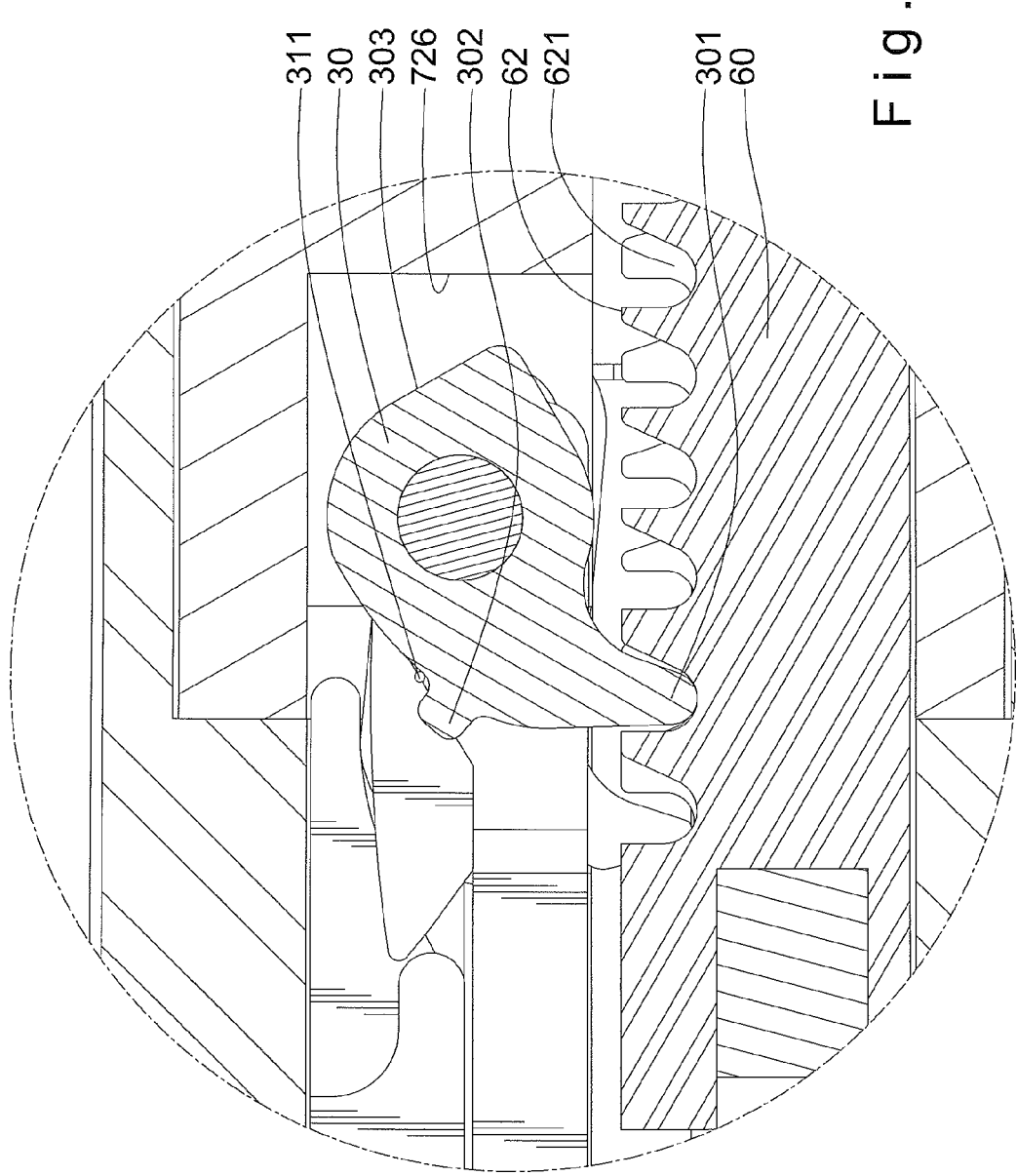
FIG. 10 is a partial, enlarged view of the shift control device shown in FIG. 9.

The first pawl 30 is pivotally mounted on the extensions of the first section 203 and includes an outer periphery forming a locking section 301, a retaining section 302 and an abutted section 303. Further, a first elastic member 31 includes at least one loop and defines two terminating ends, a first leg 311 extending from one terminating end and a second leg 312 extending from the other terminating end. The first and second legs 311 and 312 extend in different directions. Additionally, the first leg 311 is retained on the retaining section 302 of the first pawl 30 (as best shown in FIG. 10), and the second leg 312 is retained on an edge 22 of the extension. Furthermore, the first pawl 30 and the first elastic member 31 are received between the extensions and supported by a shaft (not numbered).

The shift-down control apparatus 2 includes a shift-down controller 40 and a second link member 50. The shift-down controller 40 includes an engaging hole 41 at a first end 401 and a slit 42 at a second end 402. The shift-down controller 40 further includes a closed side and an open side, and a compartment 43 is defined on the open side and is in communication with the slit 42. Additionally, the compartment 43 includes a stopping wall 44. Also, the second end 102 of the shift-up controller 10 is insertable through the slit 42 and received in the compartment 43.

The second link member 50 includes a connection section 51 at a first end 501 and first and second sections 503 and 504 at a second end 502. The first end 501 is disposed in the compartment 43 and is connected with the shift-down controller 40 by inserting a fastening device (not numbered) into the engaging hole 41 and the connection section 51. Furthermore, the first section 503 is a space recessed in the second link member 50, whereas the second section 504 includes first and second actuating members 52 and 53. In the preferred embodiment, the first and second actuating members 52 and 53 both extend in the same direction but are at different levels.

Further, a retainer 54 is formed between the first and second ends 501 and 502 of the second link member 50, and the first link member 20 is inserted through the retainer 54 and is received by the retainer 54.

The transmission control assembly 3 includes a locking member 60, a housing assembly 70, a first pawl 81, a second pawl 82 and an outer case 90. A cable 64, which is utilized to control the transmission assembly (not shown) of the bicycle, has one end fixed at the locking member 60.

The locking member 60 includes two protrusions 61 at two lateral sides respectively. The locking member 60 further includes a side having a first engaging section 62 and a second engaging section 63 formed thereon. The first and second engaging sections 62 and 63 extend in accordance with a longitudinal length of the locking member 60. Additionally, the first engaging section 62 includes a plurality of engaging slots 621. Each engaging slot 621 is preferably equally spaced one after the other in a direction in accordance with the longitudinal length of the locking member 60, and each engaging slot 621 extends transversely to the longitudinal length of the locking member 60. Also, the second engaging section 63 includes a plurality of engaging slots 631. Each engaging slot 631 is preferably equally spaced one after the other in a direction in accordance with the longitudinal length of the locking member 60, and each engaging slot 631 extends transversely to the longitudinal length of the locking member 60. Moreover, each engaging slot 621 and each engaging slot 631 do not align with each other.

The housing assembly 70 includes a first housing member 71 and a second housing member 72. The first housing member 71 includes a stopping edge 711 at one end and includes a first cutout 712 and a second cutout 713 at the other end. The first and second cutouts 712 and 713 extend on an outer peripheral wall of the first housing member 71 and may extend in accordance with a longitudinal length of the first housing member 71. In this preferred embodiment, the number of the first cutouts 712 is two, and the two first cutouts 712 are opposed to each other. The first housing member 71 further includes a first cavity 714 and a second cavity 715. The first and second cavities 714 and 715 are preferably coaxial. Additionally, the second cavity 715 includes a first engaging channel 7151, a second engaging channel 7152 and a third engaging channel 7153 which cooperate to form the second cavity 715.

Figure 6:
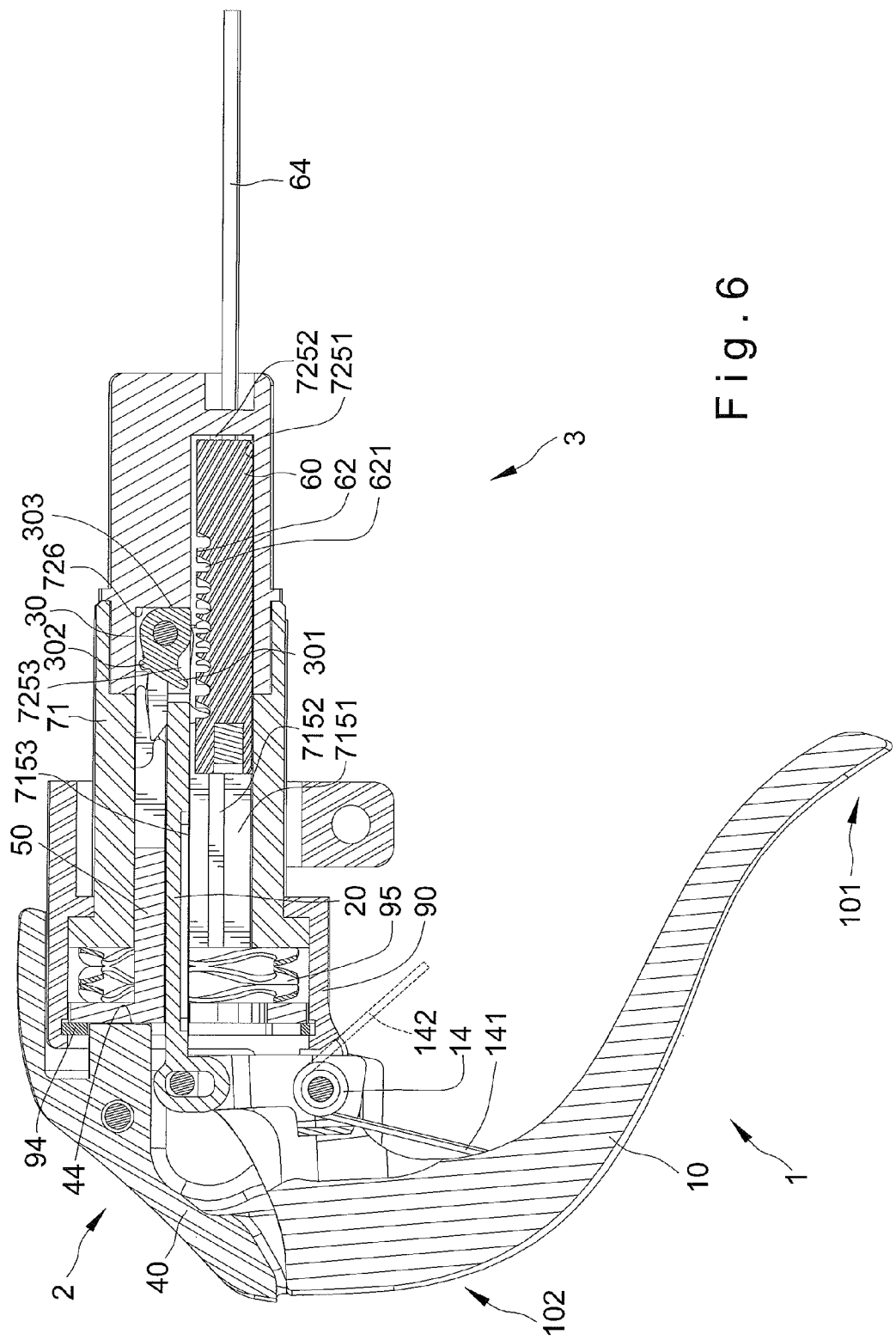
FIG. 6 is a cross-sectional view taken along line 6-6 of FIG. 1 and shows a relationship between a first pawl of a shift-up control apparatus and a locking member.

The second housing member 72 includes an end received in the first cavity 714. The second housing member 72 further includes a first ridge 721 received in the first cutout 712 and a second ridge 722 received in the second cutout 713, respectively, in order to securely engage the second housing member 72 with the first housing member 71. The second housing member 72 also includes a cavity 725 corresponding to the cross-sectional shape of the second cavity 715 and connected to and in communication with the second cavity 715. Likewise, the cavity 725 includes a first engaging groove 7251, a second engaging groove 7252 and a third engaging groove 7253 which cooperate to form the second cavity 715. FIG. 6 shows the cavity 725 also includes an abutting wall 726 defined at the bottom of the cavity 725.

Figure 15:
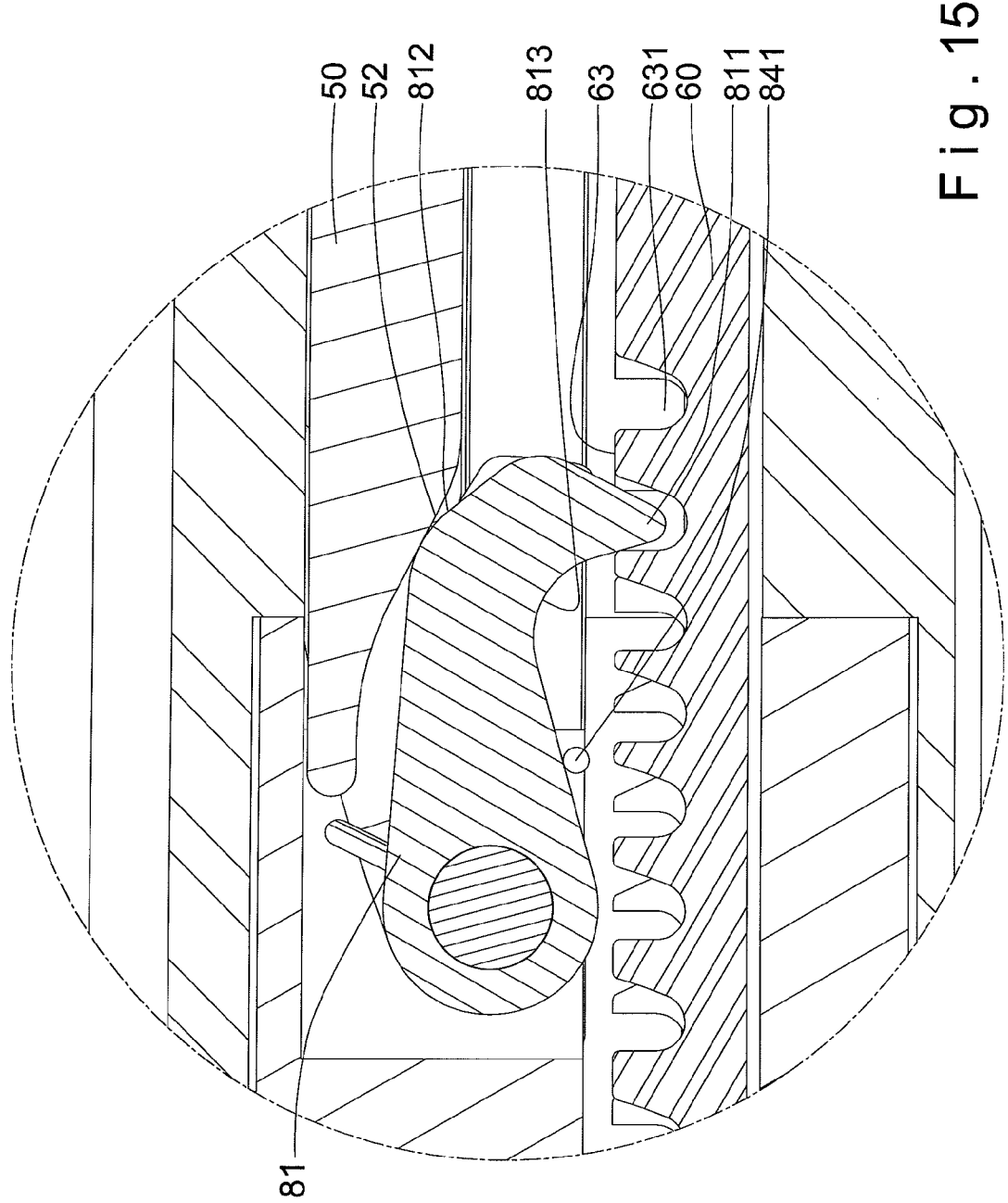
FIG. 15 is a partial, enlarged view of the shift control device shown in FIG. 14.
Figure 17:
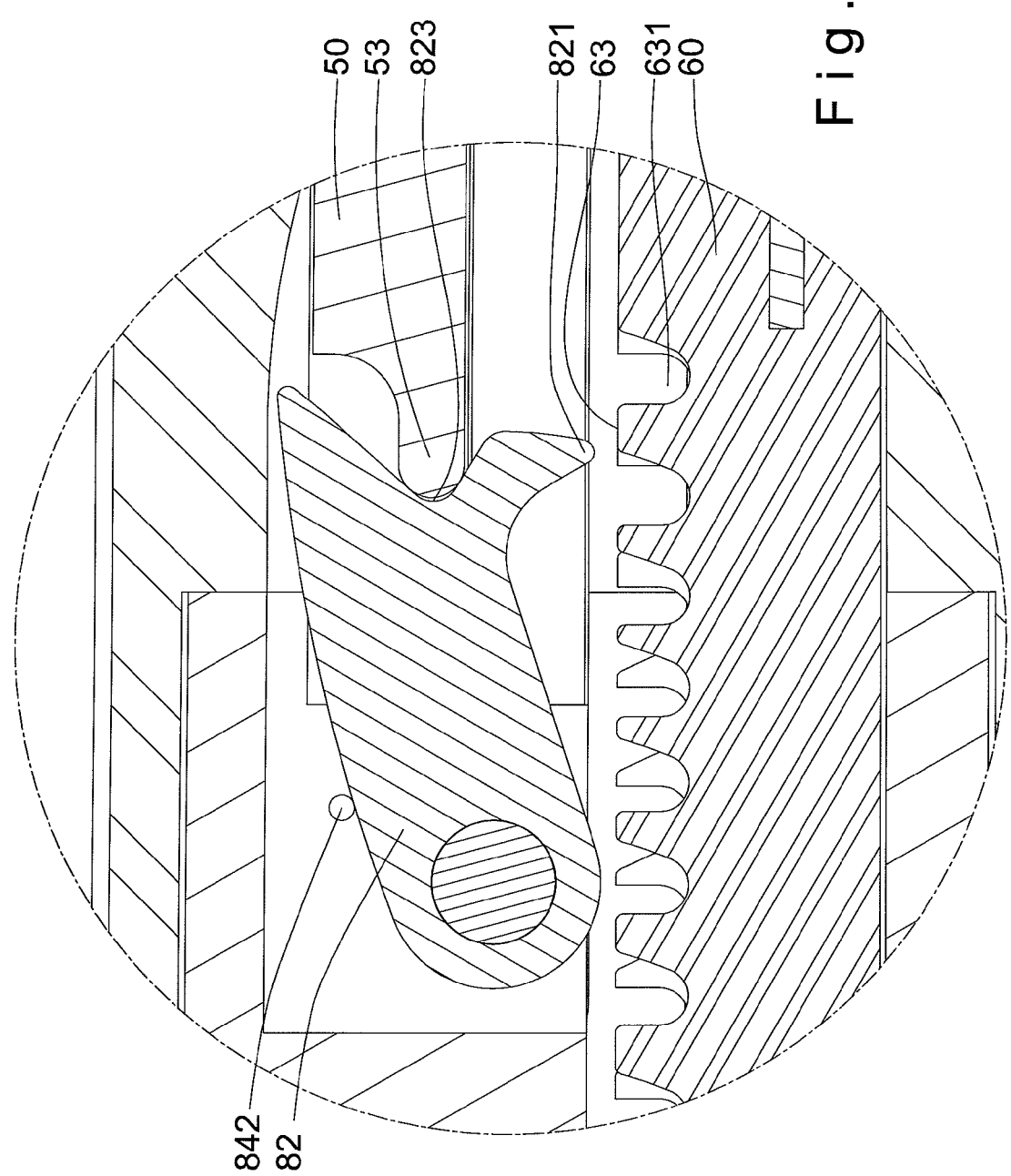
FIG. 17 is a partial, enlarged view of the shift control device shown in FIG. 16.

The first and second pawls 81 and 82 are pivotally received in the cavity 725 and are pivotally installed on a shank 83. The shank 83 has one end received in the second cutout 713 and a first orifice 723 and has another end received in a second orifice 724. The first orifice 723 is defined in a peripheral wall section of the second housing member 72 that delimits the cavity 725 and is connected to the second cutout 713. The second orifice 724 is defined in a protuberance extended in the cavity 725. Additionally, the first and second pawls 81 and 82 have a second elastic member 84 disposed therebetween, and the shank 83 is inserted through the second elastic member 84. The second elastic member 84 includes at least one loop and defines two terminating ends, a first leg 841 extending from one terminating end and a second leg 842 extending from the other terminating end. The first and second legs 841 and 842 extend in different directions. Also, the first pawl 81 includes an outer periphery forming a locking section 811, an abutted section 812 and a retaining section 813. The first leg 841 of the second elastic member 84 is retained on the retaining section 813 of the first pawl 81 (as best shown in FIG. 15). The second pawl 82 includes an outer periphery forming a locking section 821, an abutted section 822 and a retaining section 823. The second leg 842 of the second elastic member 84 is retained on the abutted section 822 of the second pawl 82 (as best shown in FIG. 17).

The outer case 90 includes two engaging portions 91 engaged with the two connecting lobes 11, respectively, to connect the outer case 90 with the shift-up controller 10. The axle 15 is inserted through the two engaging portions 91, and the axle 15 has two ends received by the engaging portions 91, respectively. Also, the outer case 90 is hollow and includes a stopping portion 92 and a recess 93 protruded in an inner peripheral wall of the outer case 90. Further, a clip 94 is received in the recess 93.

FIG. 6 shows that the second link member 50 and the housing assembly 70 are retained to prevent disengagement from the outer case 90. In the preferred embodiment, the stopping portion 92 of the outer case 90 and the clip 94 cooperate to retain the second link member 50 and the housing assembly 70. Additionally, the second link member 50 is in abutment against the stopping wall 44, and the stopping edge 711 of the housing assembly 70 is in abutment against the stopping portion 92 of the outer case 90. Further, a resilient member 95 is disposed between the second link member 50 and the housing assembly 70.

Still referring to FIG. 6, the first link member 20 is moveably retained in the third engaging channel 7153 and the third engaging groove 7253. The locking member 60 is moveably retained in the first and second engaging channels 7151 and 7152 and is moveably retained in the first and second engaging grooves 7151 and 7152. Additionally, the protrusions 61 of the locking member 60 are retained in the second engaging channel 7152 and the second engaging groove 7252. Furthermore, the outer case 90 is abutted by the second leg 142 of the elastic element 14. Furthermore, the abutted section 303 of the first pawl 30 is in abutment against the abutting wall 726 of the cavity 725 to counteract the first elastic member 31 to disengage from the first engaging section 62. Moreover, when the abutted section 303 of the first pawl 30 is in abutment against the abutting wall 726 of the cavity 725, the first pawl 81 will be disengaged from the second engaging section 63, and the locking section 821 of the second pawl 82 will engage with one of the engaging slots 631 of the second engaging section 63 to prevent the locking member 60 from movement.

Figure 9:
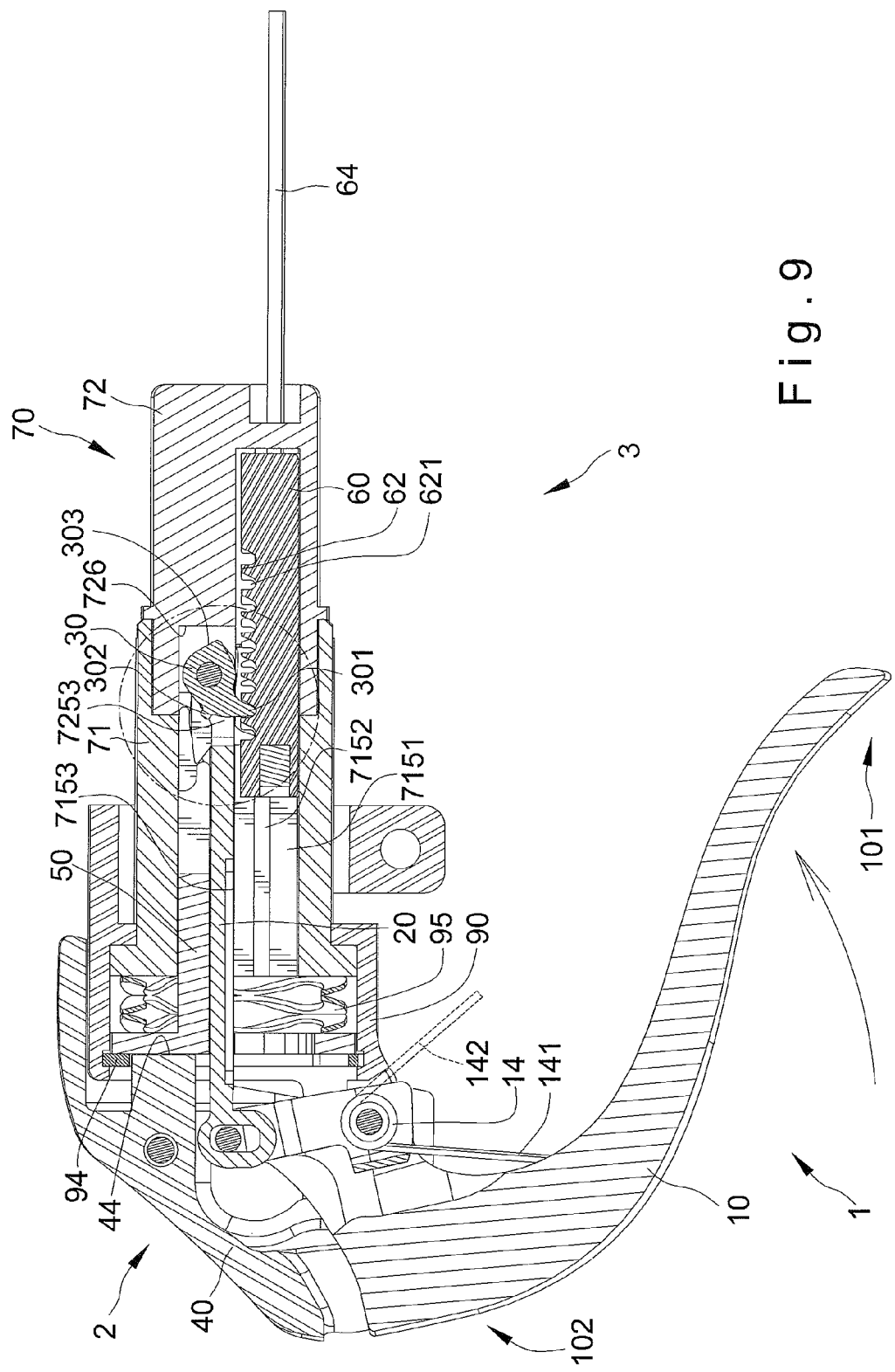
FIG. 9 is a cross-sectional view showing the shift control device shifted up and the first pawl of the shift-up control apparatus is in engagement with a first engaging section of the locking member.
Figure 11:
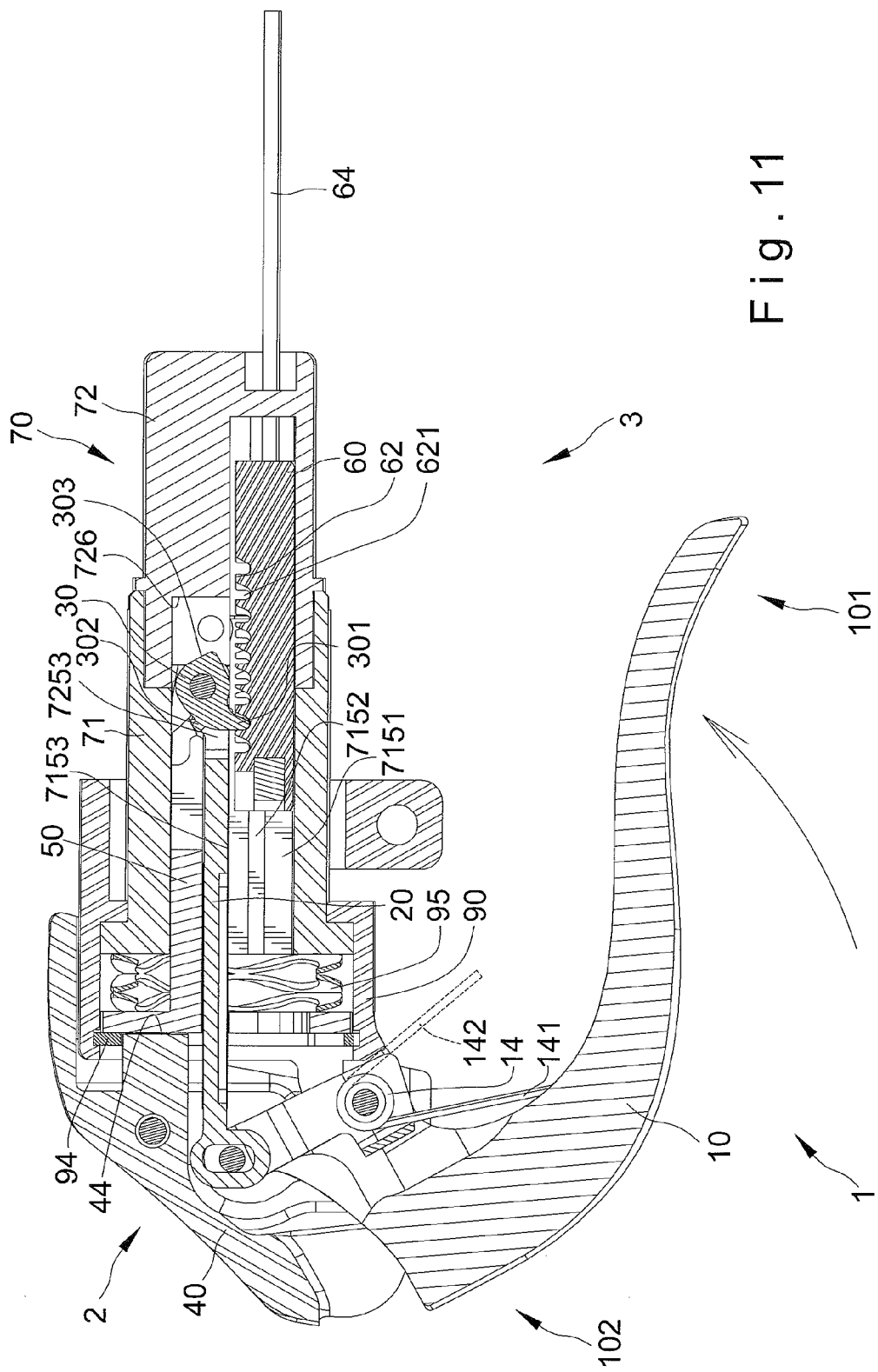
FIG. 11 is an extended cross-sectional view of FIG. 9 showing the first pawl of the shift-up control apparatus axially moved and the locking member link-moved by the first pawl of the shift-up control apparatus.
Figure 12:
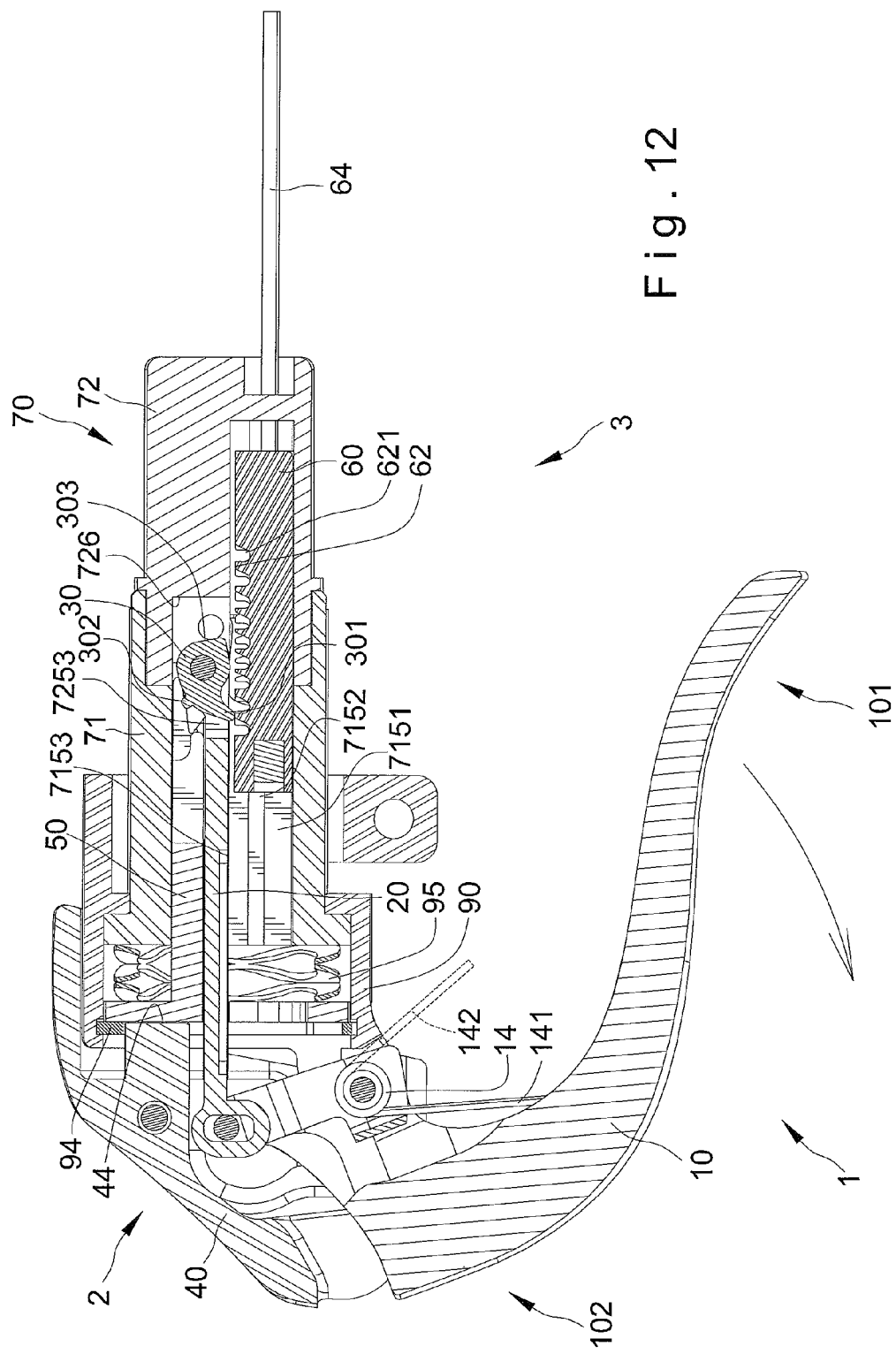
FIG. 12 is an extended cross-sectional view of FIG. 11 showing a shift-up controller released and the first pawl of the shift-up control apparatus disengaged from the first engaging section of the locking member.
Figure 13:
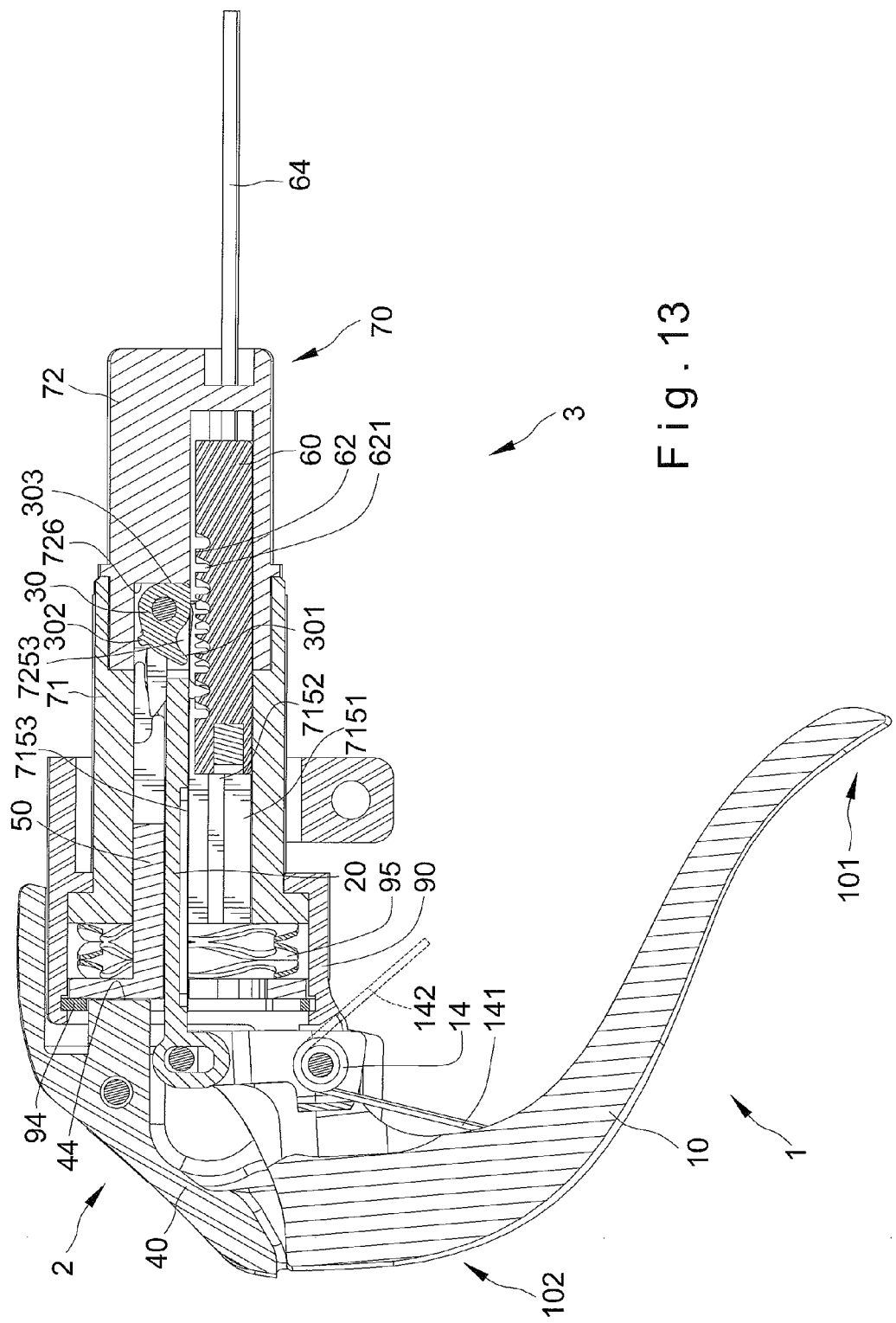
FIG. 13 is an extended cross-sectional view of FIG. 12 showing that the shift control device is in a condition that a shift-up is completed.

FIG. 9 shows the first link member 20 is moved in a first direction by the shift-up controller 10, the first pawl 30 is moved by the first link member 20 until the abutted section 303 of the first pawl 30 is disengaged from the abutting wall 726, and the locking section 301 of the first pawl 30 is biased by the first elastic member 31 to engage with one of the engaging slots 621 of the first engaging section 62. FIG. 11 is an extension of FIG. 9 and shows that the shift-up controller 10 is further pivoted in the counterclockwise direction. Consequently, the first link member 20 is further moved in the first direction, and the first pawl 30 pulls the locking member 60 through a distance in the first direction. While the locking member 60 is moved, the third pawl 83 is disengaged from the engaged engaging slot 631 of the second engaging section 63 of the locking member 60 and engage with another engaging slot 631 successively, and the locking member 60 pulls the cable 64 to shift up bicycle speed transmission. FIG. 12 is an extension of FIG. 11 and shows the shift-up controller 10 is released and the first pawl 30 is disengaged from the first engaging section 62. FIG. 13 is an extension of FIG. 12 and shows the shift-up controller 10 and the first link member 20 are returned until the abutted section 303 of the first pawl 30 is in abutment against the abutting wall 726.

Figure 7:
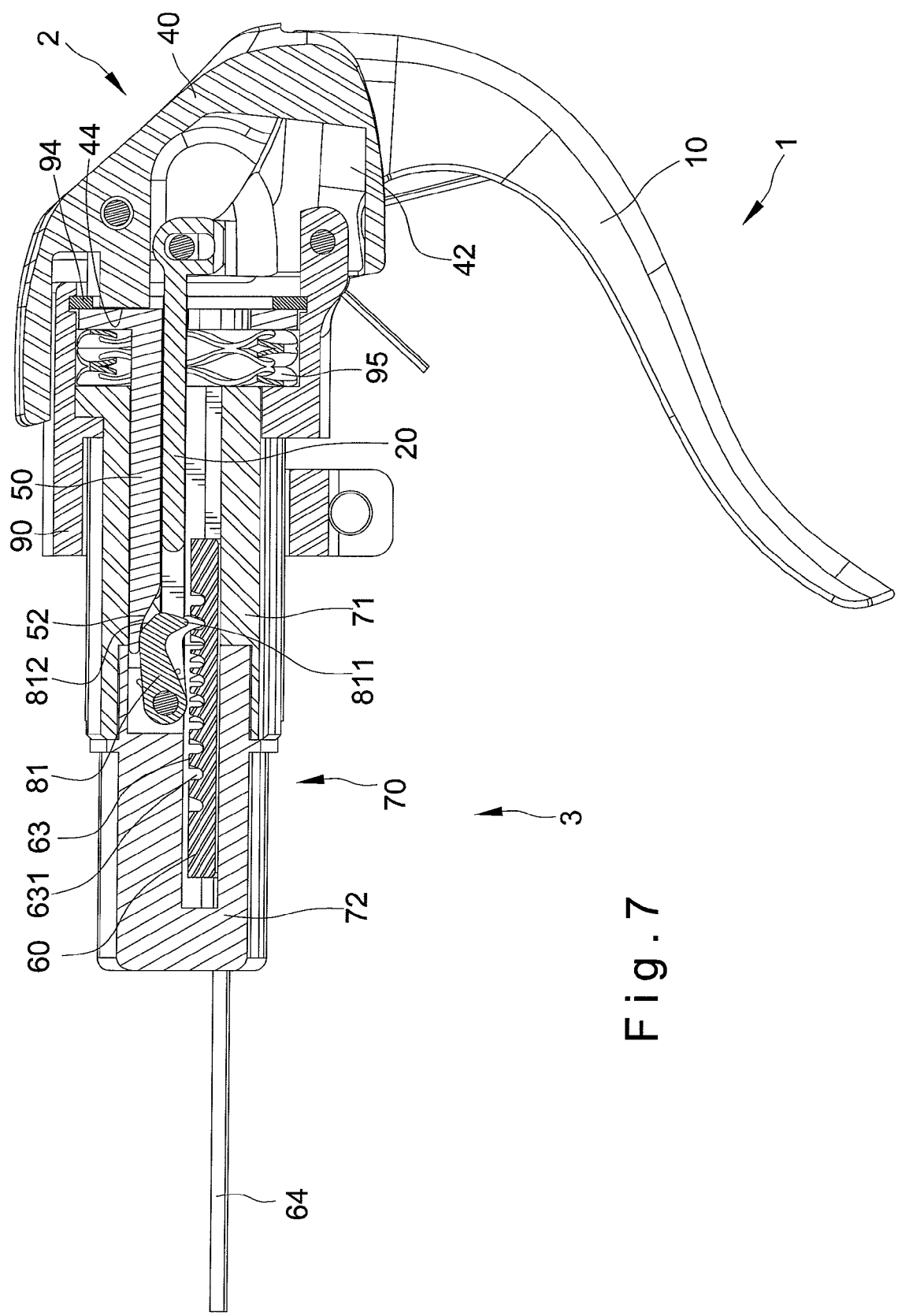
FIG. 7 is a cross-sectional view taken along line 7-7 of FIG. 1 and shows a relationship between a first pawl of a transmission control assembly and the locking member.
Figure 8:
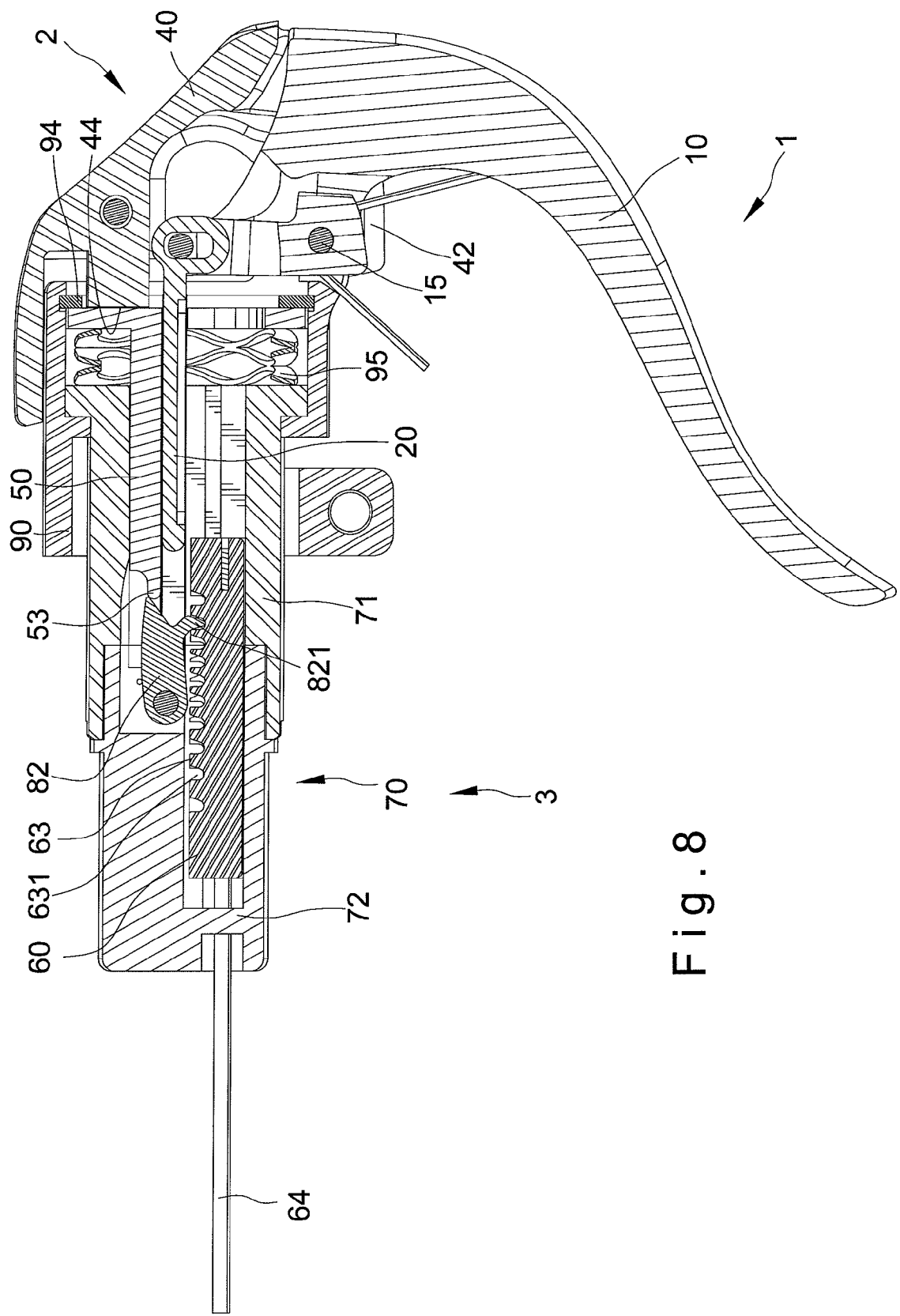
FIG. 8 is a cross-sectional view taken along line 8-8 of FIG. 1 and shows a relationship between a second pawl of the transmission control assembly and the locking member.

Referring to FIGS. 11 through 13, the locking member 60 is retained stationary even though the first pawl 30 is disengaged from the first engaging section 62. This is because the locking section 821 of the second pawl 82 is in engagement with one of the engaging slots 631 of the second engaging section 63 (as shown in FIG. 8). Additionally, the first pawl 81 is disengaged from the second engaging section 63 (as shown in FIG. 7). Based on the forgoing, it is one aspect of the present invention that pivotal movement of the shift-up controller 10 determines how far the first link member 20 moves, and this determines how many gear stages are shifted up. Additionally, the first link member 20 can be designed to travel a predetermined distance to change one gear stage, two gear stages or more.

FIGS. 14 through 17 show that the shift-down controller 40 is operated in a direction shown by an arrow to shift down bicycle speed transmission. It is one aspect of the present invention that the operation of the shift-down controller 40 enables a change of one gear stage at a time. In addition, the operation of shift-down controller 40 is independent to the shift-up controller 10. Thus, when shifting down bicycle speed transmission, the first pawl 30 remains disengaged from the first engaging section 62, and the abutted section 303 of the first pawl 30 is in abutment against the abutting wall 726.

Figure 14:
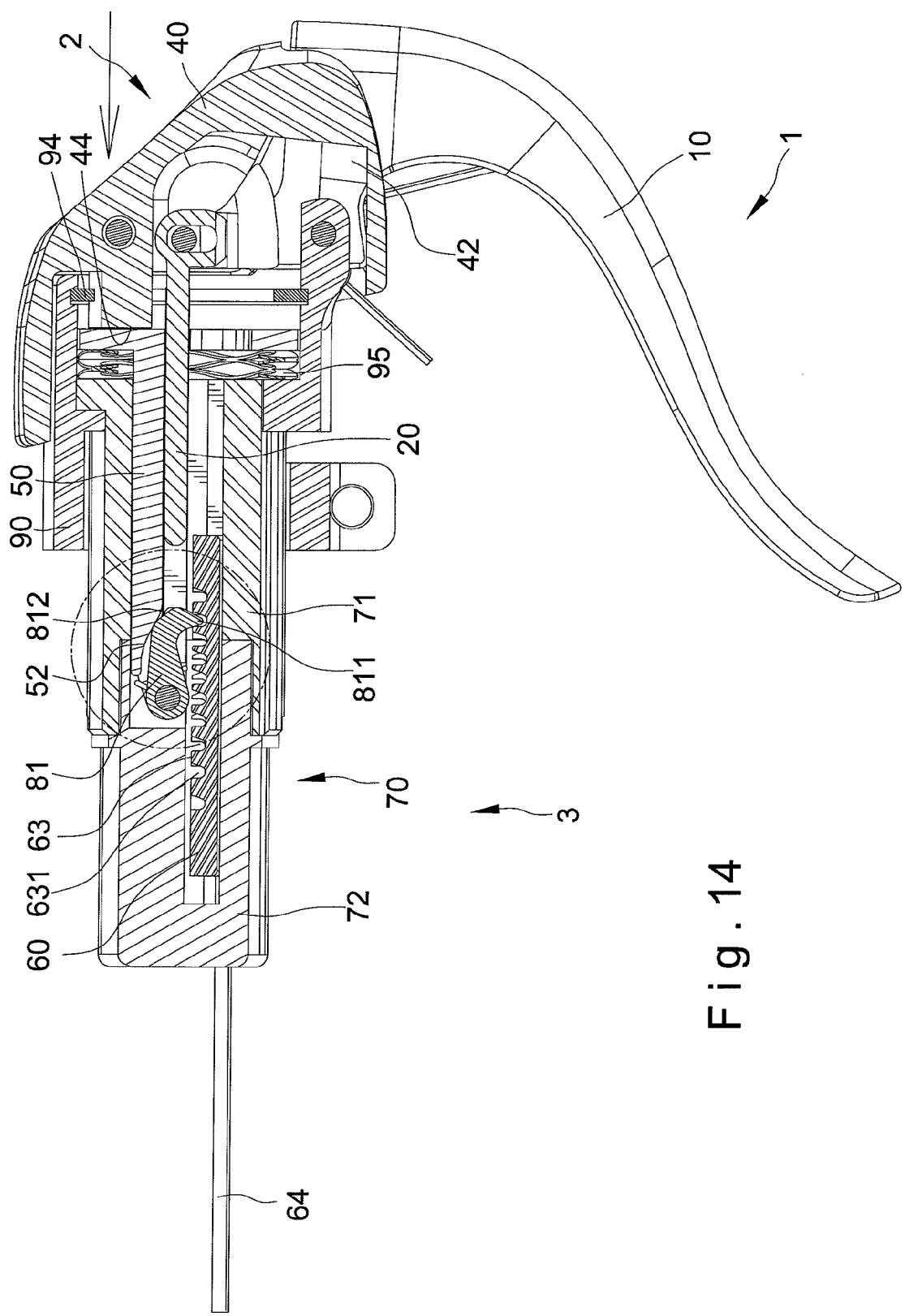
FIG. 14 is a cross-sectional view showing the shift control device shifted down and the first pawl of the transmission control assembly in engagement with a second engaging section of the locking member.
Figure 16:
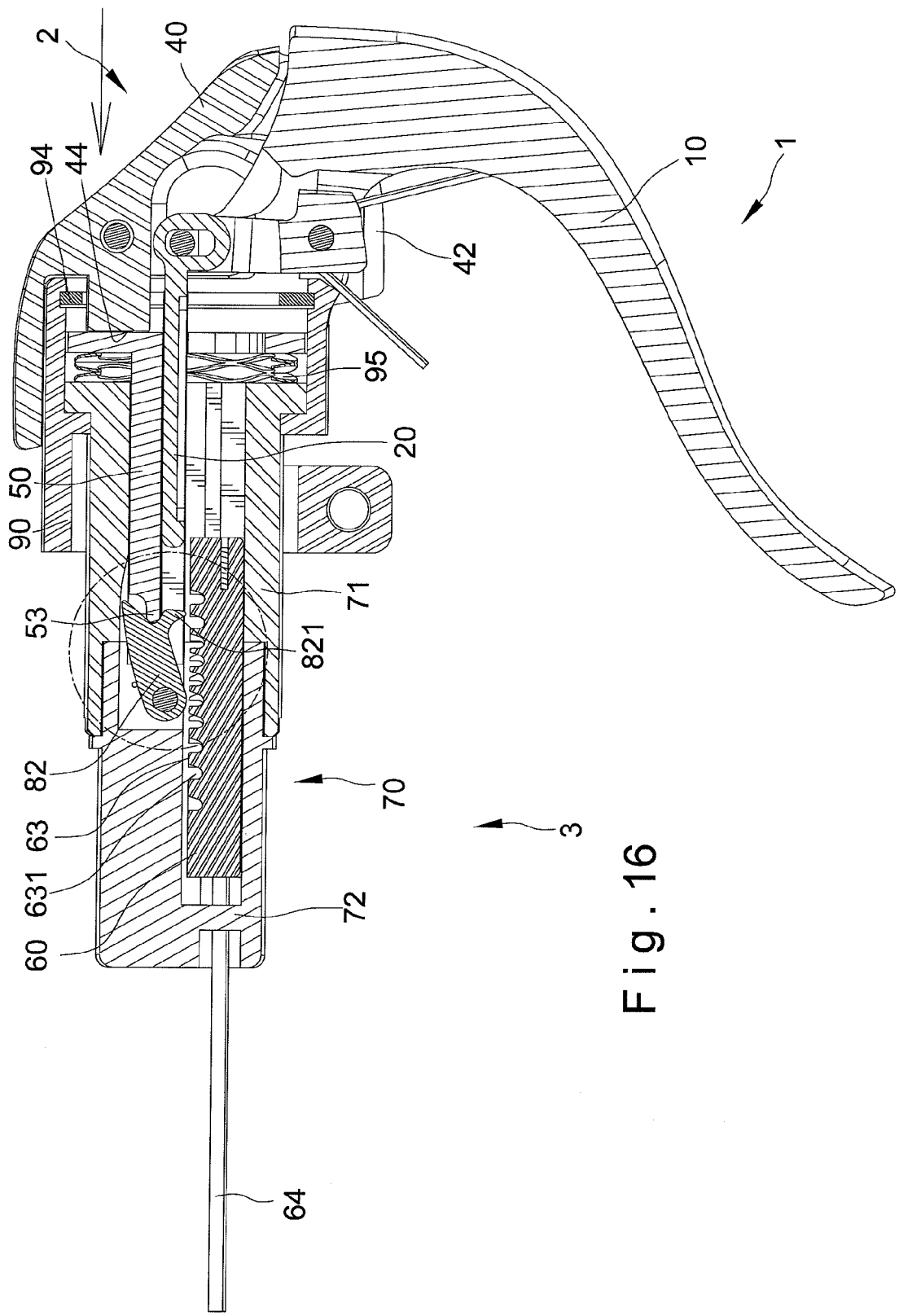
FIG. 16 is an extended cross-sectional view of FIG. 14 showing a relationship of the second pawl of the transmission control assembly and the locking member after the first pawl of the transmission control assembly is in engagement with the locking member.

FIG. 14 shows the resilient member 95 is depressed by the shift-down controller 40 and the second link member 50 is moved. The abutted section 812 of the first pawl 81 is urged by the first actuating member 52 until the locking section 811 of the first pawl 81 is engaged with one of the engaging slot 631 of the second engaging section 63 of the locking member 60. FIG. 16 shows as the first pawl 81 is engaged with the second engaging section 63 of the locking member 60 (shown in FIG. 12), the second pawl 82 is urged by the second actuating member 53 until the second actuating member 53 is received in the retaining section 823 of the second pawl 82, and the second pawl 82 is disengaged from the second engaging section 63 of the locking member 60. By further moving the shift-down controller 40, the locking member 60 is moved in a second direction reverse to the first direction, and the bicycle speed transmission is shifted down.

Figure 18:
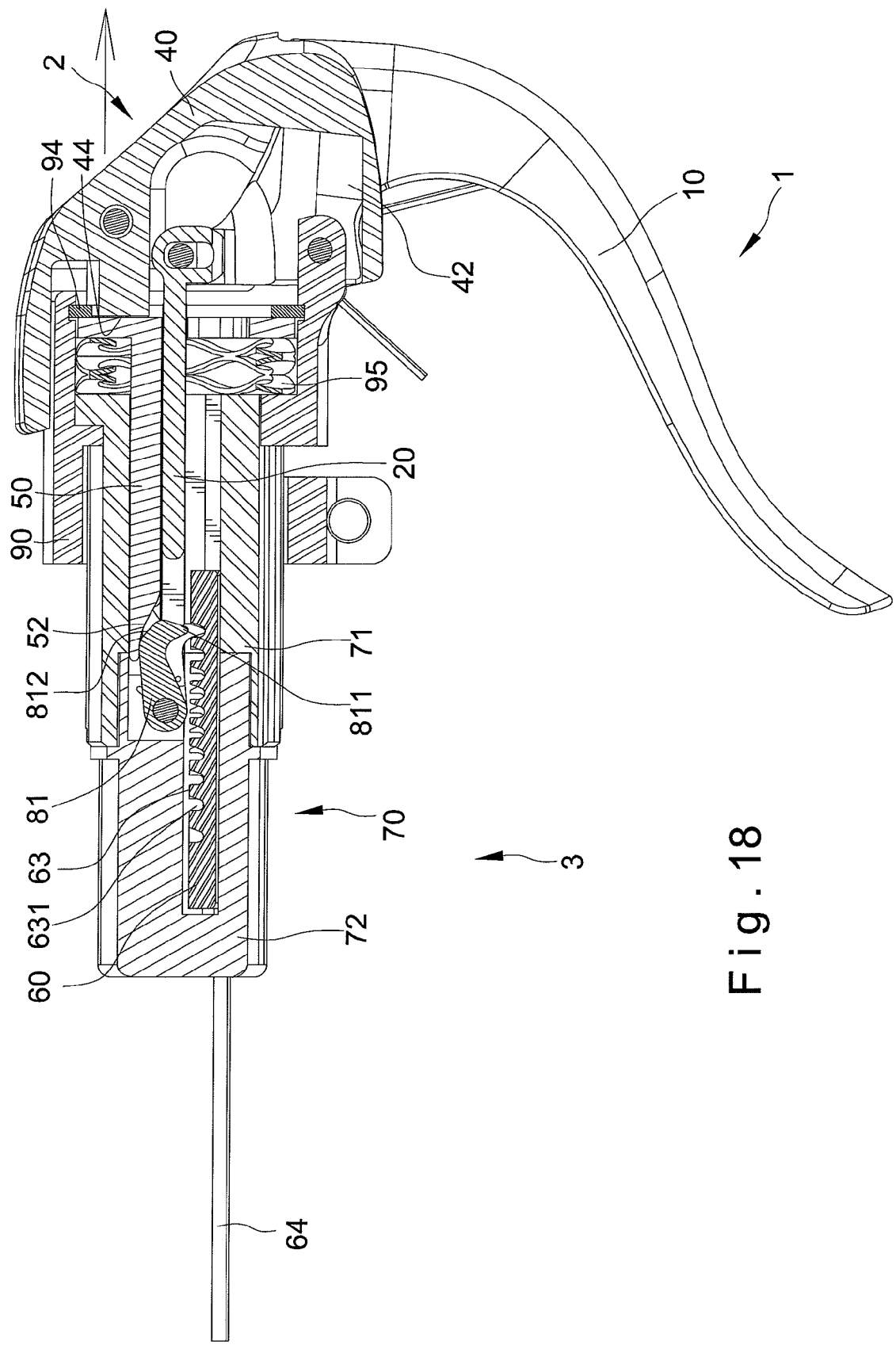
FIG. 18 is a cross-sectional view showing a shift-down controller released and the first pawl of the transmission control assembly disengaged from the second engaging section of the locking member.
Figure 19:
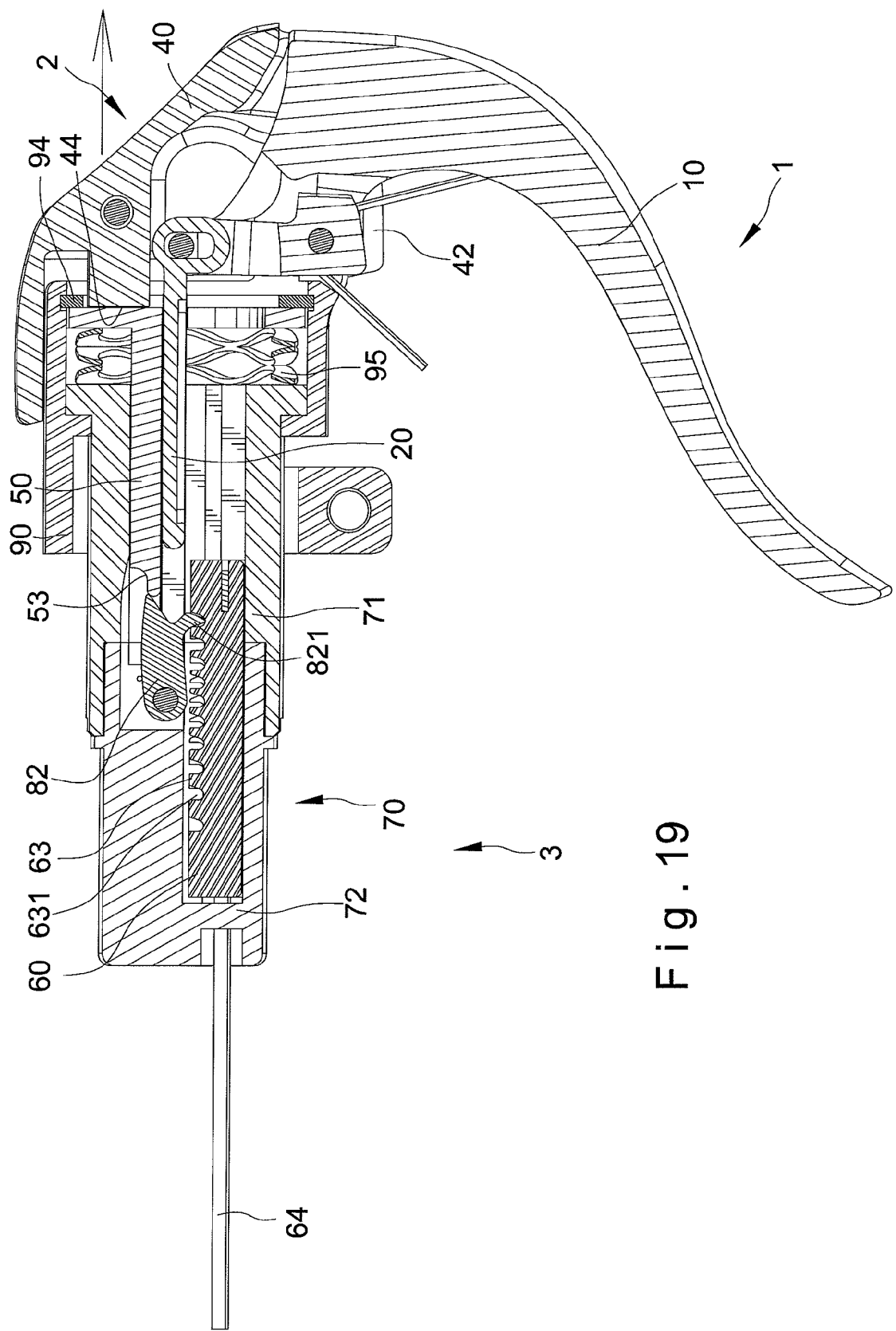
FIG. 19 is an extended cross-sectional view of FIG. 18 showing a relationship of the second pawl of the transmission control assembly and the locking member after the first pawl of the transmission control assembly is disengaged from the locking member.

FIGS. 18 and 19 show that the shift-down controller 40 is released and the resilient member 95 and the second link member 50 are returned until the first pawl 81 is disengaged from one of the second engaging section 63 of the locking member 60, and the second actuating member 53 is disengaged from the retaining section 823 of the second pawl 82 to enable the second pawl 82 to engage with the second engaging section 63 of the locking member 60.

While the specific embodiments have been illustrated and described, numerous modifications are possible without significantly departing from the spirit of invention, and the scope of invention is limited only by the scope of the accompanying claims.

What is claimed is:

1. A shift control device for bicycle comprising:
a shift-up control apparatus including an operable shift-up controller, a first link member connected with the shift-up controller and a first pawl pivotally mounted on the first link member;
a shift-down control apparatus including an operable shift-down controller and a second link member connected with the shift-down controller, with the second link member including first and second actuating members;
a transmission control assembly including a locking member, a housing assembly and first and second pawls, with the locking member moveable in the housing assembly at various positions for various bicycle speed transmissions and including first and second engaging sections, with the first engaging section selectively engaged by the first pawl of the shift-up control apparatus and the second engaging section selectively engaged by the first and second pawls of the transmission control assembly, with the shift-up controller enabling movement of the first link member and the first pawl of the shift-up control apparatus to engage with the first engaging section, with further movement of the first link member causing travel of the locking member in a first direction and movement of the locking member causing the second pawl of the transmission control assembly to disengage from the second engaging section and engage with the second engaging section reciprocally, and with the shift-down controller enabling the first actuating member to cause the first pawl of the transmission control assembly to engage with the second engaging section and the second actuating member to cause the second pawl of the transmission control assembly to disengage from the second engaging section and further movement of the shift-down controller causing travel of the locking member in a second direction reverse to the first direction.

2. The shift control device as claimed in claim 1 wherein the shift-up controller includes a first end and a second end, and with the second end includes two connecting lobes, and with the two connecting lobes receiving the first link member therebetween.

3. The shift control device as claimed in claim 2, wherein the first pawl of the shift-up control apparatus includes an outer periphery forming a locking section, a retaining section and an abutted section, and wherein the shift control device further comprises a first elastic member including at least one loop and defining two terminating ends, a first leg extending from one terminating end and a second leg extending from the other terminating end, with the first and second legs extending in different directions, and with the first leg retained on the retaining section of the first pawl of the shift-up control apparatus and the second leg retained on an edge of the extension.

4. The shift control device as claimed in claim 3 wherein the housing assembly includes a first housing member and a second housing member securely connected with each other, with the first housing member including a first cavity and a second cavity, with the second cavity including a first engaging channel, a second engaging channel and a third engaging channel which cooperate to form the second cavity, with the second housing member including an end received in the first cavity, with the end including a third cavity corresponding to the cross-sectional shape of the second cavity and connected to the second cavity, with the third cavity including an abutting wall defined at the bottom of the third cavity.

5. The shift control device as claimed in claim 4 wherein the shift-up controller is releasable and returned to a position until the first pawl is disengaged from the first engaging section and the abutted section of the first pawl is in abutment against the abutting wall.

6. The shift control device as claimed in claim 1 further comprising an elastic element including at least one loop and defining two terminating ends, a first leg extending from one terminating end and a second leg extending from the other terminating end, with the first and second legs extending in different directions, and with the first leg abutting against a periphery of the shift-up controller.

7. The shift control device as claimed in claim 1, wherein the first link member includes a first joining end connected with the shift-up controller and a second joining end including a first section and a second section, and with the first section including an extension for pivotably connecting with the first pawl of the shift-up control apparatus.

8. The shift control device as claimed in claim 1 wherein the first and second actuating members both extend in the same direction but are at different levels.

9. The shift control device as claimed in claim 1 wherein the first and second engaging sections extend in accordance with a longitudinal length of the locking member, wherein the first engaging section includes a plurality of first engaging slots, with each first engaging slot spaced one after the other in a direction in accordance with the longitudinal length of the locking member, with each first engaging slot extending transversely to the longitudinal length of the locking member, with the second engaging section including a plurality of second engaging slots, with each second engaging slot spaced one after the other in a direction in accordance with the longitudinal length of the locking member, with each second engaging slot extending transversely to the longitudinal length of the locking member.

10. The shift control device as claimed in claim 9 wherein each first engaging slot and each second engaging slot are not aligned with each other.

11. The shift control device as claimed in claim 1 wherein the housing assembly includes a first housing member and a second housing member securely connected with each other, with the first housing member including a first cavity and a second cavity, with the second cavity including a first engaging channel, a second engaging channel and a third engaging channel which cooperate to form the second cavity, with the second housing member including an end received in the first cavity, with the end including a third cavity corresponding to the cross-sectional shape of the second cavity and connected to the second cavity, with the third cavity including an abutting wall defined at the bottom of the third cavity.

12. The shift control device as claimed in claim 1 wherein the first and second pawls of the transmission control assembly have a second elastic member disposed therebetween, with the second elastic member including at least one loop and defining two terminating ends, a first leg extending from one terminating end and a second leg extending from the other terminating end, with the first and second legs extending in different directions, with the second pawl including an outer periphery forming a first locking section, a first abutted section and a first retaining section, with the first leg of the second elastic member retained on the first retaining section, with the second pawl of the transmission control assembly including an outer periphery forming a second locking section, a second abutted section and a second retaining section, and with the second leg of the second elastic member retained on the second abutted section.

13. The shift control device as claimed in claim 12 wherein the second actuating member is engaged with the retaining section of the second pawl of the transmission control assembly when the first pawl of the transmission control assembly is engaged with the second engaging section.

14. The shift control device as claimed in claim 13 wherein the shift-down controller is releasable and returned to a position until the first pawl of the transmission control assembly is disengaged from the locking member and the second actuating member is disengaged from the retaining section of the second pawl of the transmission control assembly to enable the second pawl of the transmission control assembly to engage with the second engaging section.

15. The shift control device as claimed in claim 1 further comprising an outer case connected with the shift-up controller, with the outer case being hollow and including a stopping portion and a recess protruded in an inner peripheral wall of the outer case, and a clip received in the recess, and with the stopping portion and the clip cooperating to retain the second link member and the housing assembly.

16. The shift control device as claimed in claim 15 further comprising a resilient member disposed between the second link member and the housing assembly.

17. The shift control device as claimed in claim 1 wherein the first and second pawls of the transmission control assembly are separately pivotally mounted on the housing assembly about a common pivot axis.

* * * * *